(12) United States Patent
Ito et al.

(10) Patent No.: US 8,486,554 B2
(45) Date of Patent: Jul. 16, 2013

(54) ALKALINE BATTERY SEPARATOR, PROCESS FOR PRODUCTION THEREOF AND ALKALINE BATTERIES

(75) Inventors: Yasuhiro Ito, Ibaraki (JP); Yoshihiko Kondo, Ibaraki (JP); Masanao Tanaka, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 1147 days.

(21) Appl. No.: 12/443,047

(22) PCT Filed: Sep. 27, 2007

(86) PCT No.: PCT/JP2007/068758
§ 371 (c)(1),
(2), (4) Date: Mar. 26, 2009

(87) PCT Pub. No.: WO2008/047542
PCT Pub. Date: Apr. 24, 2008

(65) Prior Publication Data
US 2010/0092853 A1    Apr. 15, 2010

(30) Foreign Application Priority Data
Sep. 28, 2006  (JP) .................................. 2006-264330

(51) Int. Cl.
*H01M 2/14*  (2006.01)
(52) U.S. Cl.
USPC ........................... 429/144; 429/247; 156/62.2
(58) Field of Classification Search
USPC .................................................. 429/129–147
See application file for complete search history.

(56) References Cited

U.S. PATENT DOCUMENTS

| 3,350,484 A * | 10/1967 | Magill, Jr. ..................... 264/505 |
| 4,078,124 A * | 3/1978 | Prentice ......................... 429/144 |
| 5,939,222 A * | 8/1999 | Senyarich et al. .............. 429/94 |
| 2002/0090876 A1* | 7/2002 | Takase et al. ................ 442/363 |

FOREIGN PATENT DOCUMENTS

| JP | 5-314961 A | 11/1993 |
| JP | 7-272709 A | 10/1995 |
| JP | 9-289005 A | 11/1997 |
| JP | 11-126595 A | 5/1999 |
| JP | 2002-124239 A | 4/2002 |
| JP | 2002-124242 A | 4/2002 |
| JP | 2002-180330 A | 6/2002 |
| JP | 2006-286326 A | 10/2006 |
| JP | 2007-48533 A | 2/2007 |

OTHER PUBLICATIONS

The International Search Report for PCT/JP2007/068758, dated Dec. 21, 2007.

* cited by examiner

*Primary Examiner* — Maria J Laios
(74) *Attorney, Agent, or Firm* — Heslin Rothenberg Farley & Mesiti P.C.

(57) ABSTRACT

An alkaline battery separator comprises a fused fiber layer, and a fine fiber layer adjacent to the fused fiber layer and comprising fine fibers and second fusible fibers, which are fused in the fine fiber layer, wherein part of the fine fibers are incorporated into the fused fiber layer, so that in determining a delamination strength between the fused fiber layer and the fine fiber layer, delamination occurs in the fine fiber layer and therefore the determination results in failure. A process for manufacturing the separator includes preparing a fused fiber sheet, preparing a slurry containing fine fibers and second fusible fibers, scooping up the slurry with the fused fiber sheet, to thereby incorporate part of the fine fibers into the fused fiber sheet, and fusing the second fusible fibers in the fused fiber sheet.

10 Claims, No Drawings

ALKALINE BATTERY SEPARATOR, PROCESS FOR PRODUCTION THEREOF AND ALKALINE BATTERIES

CROSS REFERENCE TO RELATED APPLICATIONS

This application is a national stage filing under section 371 of International Application No. PCT/JP2007/068758, filed on Sep. 27, 2007, and published in Japanese on Apr. 24, 2008, as WO 2008/047542, and which claims priority of Japanese application No. 2006-264330, filed on Sep. 28, 2006, the entire disclosure of these applications being hereby incorporated herein by reference.

TECHNICAL FIELD

The present invention relates to an alkaline battery separator, a process for production thereof, and alkaline batteries.

BACKGROUND ART

In a battery, a separator is used to separate a positive electrode and a negative electrode, to prevent a short circuit therebetween, and further, to hold an electrolyte thereon and enable a smooth electromotive reaction.

Recently, the space allotted for the battery in electronic equipment has become smaller, due to the need for miniaturization and weight-saving. Nevertheless, the performance requirement for the smaller battery is the same as or higher than that for a conventional battery, and therefore, it is necessary to enhance the capacity of the battery, and to increase the amounts of active materials in the electrodes. Accordingly, the volume allotted in the battery for the separator must be reduced.

As such a separator having a reduced volume allotted in the battery, the present applicant discloses "a battery separator consisting essentially of a nonwoven fabric having a substantially unilayered structure, wherein an apparent total surface area of fibers per surface density of the nonwoven fabric is 20 m² or more, a thickness of the nonwoven fabric is 0.1 mm or less, a uniformity index of the nonwoven fabric is 0.15 or less, and the nonwoven fabric contains fine fibers having a fiber diameter of 4 μm or less" (patent reference 1).

Further, "a battery separator characterized in that a layer made of a wet-laid papermaking web and containing heat-adhesive fibers (B) at a mass ratio of 0.1 or more with respect to the whole mass of fibers constituting the wet-laid papermaking web is laminated on at least a surface of a wet-laid nonwoven fabric in which heat-adhesive fibers (A) are contained at a mass ratio of 0.1 or more with respect to the whole mass of constituent fibers, constituent fibers are heat-adhered with the heat-adhesive fibers (A), the interlayer between the wet-laid nonwoven fabric and the wet-laid papermaking web layer is integrated by heat-adhesion with at least one kind of fibers selected from the heat-adhesive fibers (A) and the heat-adhesive fibers (B), and a peeling strength determined by JIS-L-1086, 6.19.1 is 0.1 to 5 N" is disclosed in patent reference 2.

Furthermore, the present applicant discloses "a nonwoven fabric comprising an entangled fiber web containing a low-density region, wherein a fibrous material is adhered to at least the low-density region, and an average pore size is 12 μm or less" (patent reference 3).

[patent reference 1] Japanese Unexamined Patent Publication (Kokai) No. 2002-124239 (claim 1, Examples, and the like)
[patent reference 2] Japanese Unexamined Patent Publication (Kokai) No. 2002-124242 (claim 1 and the like)
[patent reference 3] Japanese Unexamined Patent Publication (Kokai) No. 7-272709 (claim 1, paragraph [0037], and the like)

DISCLOSURE OF THE INVENTION

Problems to be Solved by the Invention

As disclosed in the Examples of patent reference 1, the battery separator prepared by a wet-laid method and having a thickness of approximately 0.1 mm exhibits a sufficient denseness and strength, and therefore, a short circuit does not occur when a battery is assembled. However, when the separator is designed to be thinner, due to a commercial desire for a further slimming down of batteries, the denseness and strength of the separator are lowered, and a short circuit is liable to occur when a battery is assembled. Further, a low mass per unit area, which is necessary for the slimming down, results in breakages during transport due to a low strength of the fiber web, a precursor of the nonwoven fabric, and therefore, drastically reduces the productivity. Furthermore, when the content of the fine fibers is increased to enhance the denseness, and a fiber web is produced by a wet-laid method, the fine fibers are incorporated into a papermaking wire, and the production cannot be continued due to difficulty of peeling the fiber web from the papermaking wire.

The battery separator disclosed in patent reference 2 has a moderate denseness and strength. However, nonuniformity of electrolyte is liable to occur in the interlayer between the wet-laid nonwoven fabric layer and the wet-laid papermaking web layer, and therefore, a battery comprising this separator exhibits a high electrical resistance.

The battery separator disclosed in patent reference 3 contains a fibrous material having a fibril-shaped branch structure, and therefore, the fibrous material and the entangled fiber web are not sufficiently integrated. As a result, nonuniformity of electrolyte is liable to occur in the interlayer between a layer of the fibrous material and the entangled fiber web, and so, a battery comprising this separator exhibits a high electrical resistance.

The above problems may be solved by the present invention, and an object of the present invention is to provide an alkaline battery separator which has an excellent denseness and strength, even if the thickness is less than 0.1 mm, and enables the production of an alkaline battery having a low electrical resistance, a process for manufacturing an alkaline battery separator, wherein the separator can be produced at a high productivity without breakages during its production, and an alkaline battery.

Means for Solving the Problems

The present invention relates to
[1] an alkaline battery separator, characterized by comprising a fused fiber layer in which first fusible fibers are fused, and a fine fiber layer adjacent to the fused fiber layer and comprising fine fibers having an average fiber diameter of 5 μm or less and second fusible fibers, which are fused in the fine fiber layer, wherein part of the fine fibers are incorporated into the fused fiber layer, so that in determining a delamination strength between the fused fiber layer and the fine fiber layer, delamination occurs in the fine fiber layer and therefore the determination results in failure,
[2] the alkaline battery separator of [1], wherein the fine fiber has an average fiber diameter of 2 μm or less,

[3] the alkaline battery separator of [1] or [2], wherein the fused fiber layer has a mass per unit area of 5 to 30 g/m$^2$, and the fine fiber layer has a mass per unit area of 1 to 50 g/m$^2$,

[4] the alkaline battery separator of [1] to [3], wherein the separator has a tensile strength per unit mass per unit area of 2 N/5 cm width or more,

[5] the alkaline battery separator of [1] to [4], wherein the separator has a uniformity index of 0.1 or less,

[6] the alkaline battery separator of [1] to [5], wherein the shape of the separator is maintained only by the fusion of the first and second fusible fibers and the incorporation of the fine fibers into the fused fiber layer,

[7] the alkaline battery separator of [1] to [6], wherein the separator has a ratio of a maximum pore size/a mean flow pore size of 1.7 or less,

[8] a process for manufacturing an alkaline battery separator, characterized by comprising the steps of:

preparing a fused fiber sheet in which first fusible fibers are fused, preparing a slurry containing fine fibers having an average fiber diameter of 5 μm or less and second fusible fibers, scooping up the slurry with the fused fiber sheet, to thereby incorporate part of the fine fibers into the fused fiber sheet, and fixing the fine fibers by fusing the second fusible fibers in the slurry scooped up with fused fiber sheet,

[9] the process of [8], wherein the fused fiber sheet is made of a wet-laid nonwoven fabric,

[10] the process of [8] or [9], wherein the fine fibers have an average fiber diameter of 2 μm or less,

[11] the process of [8] to [10], wherein the slurry is scooped up with the fused fiber sheet by aspirating the slurry from a surface of the fused fiber sheet, said surface being opposite to a surface on which the slurry is scooped up, and

[12] an alkaline battery comprising the alkaline battery separator of [1] to [7].

Effects of the Invention

According to the alkaline battery separator of [1] of the present invention, the strength of the separator is maintained by the fused fiber layer, and the denseness thereof is imparted by the fine fiber layer. Part of the fine fibers which form the fine fiber layer are incorporated into and integrated with the fused fiber layer, so that the fused fiber layer cannot be peeled from the fine fiber layer, even if the layers are delaminated at the interlayer between both layers. As a result, nonuniformity of electrolyte is not liable to occur in the interlayer between the fused fiber layer and the fine fiber layer, and therefore, the electrical resistance of a battery can be lowered.

According to the alkaline battery separator of [2] of the present invention, the fine fibers have an average fiber diameter of 2 μm or less, and therefore, the separator exhibits an excellent denseness.

The alkaline battery separator of [3] of the present invention has a desired strength and denseness.

The alkaline battery separator of [4] of the present invention has an excellent tensile strength, and therefore, a short circuit is not liable to occur when a battery is assembled.

The alkaline battery separator of [5] of the present invention has an excellent denseness and is capable of effectively preventing a short circuit.

The alkaline battery separator of [6] of the present invention has an excellent denseness and is capable of effectively preventing a short circuit.

The alkaline battery separator of [7] of the present invention has an excellent denseness and is capable of effectively preventing a short circuit.

According to the process of [8] of the present invention, an alkaline battery separator having an excellent strength and denseness and capable of lowering the electrical resistance of a battery, i.e., the alkaline battery separator of [1], can be produced. Further, because a slurry containing fine fibers is scooped up with a fused fiber sheet having a moderate strength, breakages do not occur during transport, and the fine fibers do not incorporate into a papermaking wire to produce the separator at a good productivity.

According to the process of [9] of the present invention, an alkaline battery separator having an excellent denseness can be produced.

According to the process of [10] of the present invention, an alkaline battery separator having an excellent denseness can be produced.

According to the process of [11] of the present invention, the fine fibers can be deeply incorporated into the fused fiber sheet, and therefore, an alkaline battery separator in which nonuniformity of an electrolyte is not liable to occur in the interlayer between the fused fiber layer and the fine fiber layer can be produced.

The alkaline battery of [12] of the present invention is capable of effectively preventing a short circuit, and exhibits a low electrical resistance.

BEST MODE FOR CARRYING OUT THE INVENTION

The alkaline battery separator of the present invention (hereinafter simply referred to as the "separator") contains a fused fiber layer in which the first fusible fibers are fused, so as to impart strength to the separator. The fused fiber layer is not particularly limited, so long as the strength necessary to assemble an alkaline battery using the separator can be imparted to the separator. A fused fiber layer which can impart a tensile strength per unit mass per unit area of 2 N/5 cm width or more to the separator is preferable.

The first fusible fiber constituting the fused fiber layer may be a single first fusible fiber consisting of a single resin component, or a composite first fusible fiber which is composed of two or more resin components having a melting point different from each other, and has a cross-sectional shape of a side-by-side type, a core-sheath type, an islands-in-sea type, or the like. The composite first fusible fiber is preferable, because the shape of the fiber can be maintained by a nonfusible resin component, and therefore the strength of the separator can be enhanced.

The first fusible fiber is preferably composed of one or more polyolefin-based resins and/or one or more polyamide-based resins, because of their excellent alkali resistance. Examples of the single first fusible fiber include polyolefin-based fibers such as polypropylene-based fibers, polyethylene-based fibers, or a poly (4-methylpentene-1) fiber, and polyamide-based fibers such as a 6 nylon fiber or a 66 nylon fiber. Examples of combinations of high melting point/low melting point in the composite first fusible fiber include polypropylene/high-density polyethylene, polypropylene/low-density polyethylene, high-density polyethylene/low-density polyethylene, poly (4-methylpentene-1)/polypropylene, poly (4-methylpentene-1)/high-density polyethylene, poly (4-methylpentene-1)/low-density polyethylene, 66 nylon/6 nylon, 66 nylon/6-12 copolymer nylon, 66 nylon/poly (4-methylpentene-1), 66 nylon/polypropylene, 66 nylon/high-density polyethylene, 66 nylon/low-density polyethylene, poly (4-methylpentene-1)/6 nylon, 6 nylon/ polypropylene, 6 nylon/high-density polyethylene, 6 nylon/ low-density polyethylene, and 6 nylon/6-12 copolymer nylon. Among these combinations, combinations of olefin-based resins having a high alkali resistance are preferable, and the combination of polypropylene/high-density polyethylene is more preferable.

In particular, the separator containing, as the first fusible fiber, high-strength first fusible fibers having a fiber strength of 5.7 cN/dtex or more is preferable, because such high-strength fibers can further enhance the strength of the separator. As a result, a short circuit caused by a tear in the separator by an edge of an electrode, or by a penetration into the separator by a flash at the electrode, can be avoided when alkaline batteries are assembled. Because the higher the fiber strength is, the better the effects are, the fiber strength of the first fusible fiber is preferably 6.0 cN/dtex or more, more preferably 6.5 cN/dtex or more. The upper limit of the fiber strength is not particularly limited, but approximately 20 cN/dtex is appropriate. "Fiber strength" as used herein means a value measured in accordance with JIS L 1013 (length between grips=100 mm, pull rate=300 mm/min., constant rate extension type tester).

The high-strength first fusible fiber may be formed from one or more resin components similar to those of the first fusible fiber, preferably polyolefin-based resins which do not become deteriorated by an electrolyte and do not become deteriorated by electrochemical reactions in an alkaline battery. More particularly, the high-strength first fusible fiber is preferably formed from one, or two or more polyolefin-based resins selected from, for example, a propylene homopolymer, copolymers of propylene and α-olefin (for example, ethylene, butene-1, or the like), ethylene-based polymers (for example, high-density polyethylene, middle-density polyethylene, low-density polyethylene, linear low-density polyethylene, or the like), or poly (4-methylpentene-1). In particular, it is preferable that the fiber is composed of two or more resins having a melting point different from each other (the difference in melting point is preferably 10° C. or more, more preferably 20° C. or more) and that a resin other than the resin having the highest melting point is arranged at the surface of the fiber. The arrangement of resins in the cross section of the high-strength first fusible fiber consisting of two or more resins may be, for example, a core-sheath type, a side-by-side type, an orange type, an islands-in-sea type, or a multiple bimetal type. In particular, the core-sheath type or the islands-in-sea type with a high content of resin(s) which can contribute to fusion is preferable. The high-strength first fusible fibers account for preferably 10 mass % or more, more preferably 15 mass % or more, of the first fusible fibers.

The high-strength first fusible fibers may be produced by feeding undrawn fibers to a drawing bath filled with a saturated steam under pressure at an absolute pressure of 2.0 kg/cm$^2$ or more, and drawing the undrawn fibers with moisture on the surface thereof, for example, in accordance with a method disclosed in Japanese Unexamined Patent Publication (Kokai) No. 2002-180330.

The average fiber diameter of the first fusible fiber (including the high-strength first fusible fiber: Hereinafter the expression "first fusible fiber" includes the high-strength first fusible fiber) is not particularly limited, but is preferably 5 μm or more, more preferably 10 μm or more, to impart strength to the separator. Further, it is preferably 20 μm or less, more preferably 14 μm or less, to thin the separator. The fiber length of the first fusible fiber is preferably 1 to 15 mm, more preferably 3 to 10 mm, because the separator is preferably composed of a wet-laid nonwoven fabric so as to produce a thin and dense separator.

The term "fiber diameter" as used herein with respect to a fiber having a circular cross-sectional shape means a diameter of the circle. For a fiber having a non-circular cross-sectional shape, a diameter of a circle having an area the same as that of the non-circular cross-sectional shape is regarded as the fiber diameter. The term "average fiber diameter" means an arithmetic mean value calculated from the fiber diameters of 10 fibers.

The first fusible fibers, which are fused in the fused fiber layer, account for preferably 60 mass % or more, more preferably 80 mass % or more, most preferably 100 mass %, of the fused fiber layer so as to impart a sufficient strength to the separator. The fused fiber layer may contain fibers having an average fiber diameter larger than 5 μm and a melting point which is higher than that of a low-melting-point component of the first fusible fiber by 10° C. or more, as well as the first fusible fibers.

The separator of the present invention contains a fine fiber layer adjacent to the fused fiber layer so as to impart denseness to the separator and avoid a short circuit. Further, part of the fine fibers are incorporated into the fused fiber layer, so that in determining the delamination strength between the fused fiber layer and the fine fiber layer, delamination occurs in the fine fiber layer and therefore the determination results in failure. As a result, nonuniformity of an electrolyte is not liable to occur in the interlayer between the fused fiber layer and the fine fiber layer, and therefore, the electrical resistance of a battery can be lowered.

The fine fiber layer contains fine fibers having an average fiber diameter of 5 μm or less, so as to impart an excellent denseness, an excellent anti-short-circuit property, and a high electrolyte-holding capacity to the separator. Because the smaller the average fiber diameter of the fine fibers is, the better these effects are, the average fiber diameter of the fine fibers is preferably 3 μm or smaller, more preferably 2 μm or smaller. The lower limit of the average fiber diameter of the fine fibers is not particularly limited, but is preferably 0.1 μm or larger.

The fine fiber which may be used in the present invention may be formed from a material not damaged by an alkaline electrolyte. Such a material is not particularly limited, but the fine fiber preferably consists of one or more polyolefin-based resins and/or polyamide-based resins as exemplified for the first fusible fiber.

When fine fibers consisting of two or more resins having a melting point different from each other (the difference in melting point is preferably 10° C. or more) are fused, a dropping of the fine fibers from the fine fiber layer can be avoided. The arrangement of resins at the cross section of the fine fiber consisting of two or more resins may be, for example, a core-sheath type (including an eccentric type), a laminated type, an islands-in-sea type, an orange type, or a multiple bimetal type. The core-sheath type or the islands-in-sea type having a wide fusible area is preferable.

The fiber length of the fine fiber is not particularly limited, but is preferably 1 to 15 mm, more preferably 2 to 10 mm, so as to enhance the denseness of the separator.

The fine fibers account for preferably 10 mass % or more, more preferably 20 mass % or more, of the fine fiber layer so as to impart an excellent denseness and an excellent anti-short-circuit property to the separator. Because the fine fiber layer contains the second fusible fibers so as to avoid a dropping of the fine fibers, the fine fibers account for preferably 90 mass % or less, more preferably 80 mass % or less, still more preferably 70 mass % or less, most preferably 60 mass % or less.

The fine fiber which may be used in the present invention may be obtained by a conventional melt-spinning method, or by spinning islands-in-sea type composite fibers by a conventional composite spinning method or a conventional blend spinning method and removing a sea component from the islands-in-sea type composite fibers. Fine fibers having a fiber diameter of 5 μm or less can be easily obtained by the latter method. In particular, fine fibers obtained by removing a sea component from islands-in-sea type composite fibers spun by a composite spinning method is preferable, because the fine fibers are uniform in fiber diameter, and a separator having a further improved denseness can be produced.

In the separator of the present invention, part of the fine fibers are incorporated into and integrated with the fused fiber layer, so that in determining the delamination strength between the fused fiber layer and the fine fiber layer, delamination occurs in the fine fiber layer and therefore the determination results in failure. As a result, nonuniformity of an electrolyte is not liable to occur in the interlayer between the fused fiber layer and the fine fiber layer, and therefore, the electrical resistance of a battery can be lowered.

"The determination of the delamination strength between the fused fiber layer and the fine fiber layer" as used herein is a test method in accordance with JIS L 1086-1999 "Testing methods for fusible interlining fabrics, 7.19 Peeling strength, A) Without pretreatment". "Delamination occurs in the fine fiber layer and therefore the determination results in failure" as used herein means that when, after peeling, a surface of the fused fiber layer at the side of the fine fiber layer is observed under a microscope or the like, part of the fine fibers are incorporated into the fused fine layer and remained in the surface of the fused fiber layer at the side of the fine fiber layer, and as a result, the delamination strength between the fused fiber layer and the fine fiber layer is not actually determined.

The fine fiber layer contains the second fusible fibers as well as the fine fibers, and is capable of avoiding a dropping of fine fibers from the fine fiber layer by fusing the second fusible fibers. The existence of the second fusible fibers enables the whole structure of the separator and the distribution of an electrolyte to be uniform, and therefore, the electrical resistance of a battery can be lowered.

The second fusible fiber may be a single second fusible fiber similar to the single first fusible fiber, or a composite second fusible fiber similar to the composite first fusible fiber. Further, the second fusible fiber may be composed of one, or two or more resins as exemplified for the first fusible fiber. Furthermore, the second fusible fibers may contain high-strength second fusible fibers having a fiber strength of 5.7 cN/dtex or more. Such a high-strength second fusible fiber may be composed of resins as exemplified for the first fusible fiber, and the resins may be arranged as exemplified for the first fusible fiber. The average fiber diameter of the second fusible fibers is preferably 5 to 20 μm, more preferably 10 to 14 μm, which is similar to that of the first fusible fiber. The fiber length of the second fusible fiber is preferably 1 to 15 mm, more preferably 3 to 10 mm. It is preferable that the fiber diameter of the second fusible fiber is the same as that of the first fusible fiber so as to enable the whole structure of the separator to be uniform.

The second fusible fiber and the first fusible fiber may be the same or different, with respect to resin composition, resin arrangement, fiber strength, average fiber diameter, and/or fiber length. It is preferable that a resin(s) to be fused contained in the second fusible fiber has a melting point which is lower than that of a resin having the lowest melting point contained in the fine fiber by 10° C. or more, more preferably by 20° C. or more, so as to avoid the melting of fine fibers when the second fusible fibers are fused, and thereby avoid the loss of the denseness and the electrolyte-holding capacity imparted by the fine fibers.

The second fusible fibers are fused in the fine fiber layer, and the content of the second fusible fibers is not particularly limited, so long as a dropping of fine fibers can be avoided. The second fusible fibers account for preferably 10 mass % or more, more preferably 20 mass % or more, still more preferably 30 mass % or more, most preferably 40 mass % or more, of the fine fiber layer. The second fusible fibers account for preferably 90 mass % or less, more preferably 80 mass % or less, still more preferably 70 mass % or less, most preferably 60 mass % or less, of the fine fiber layer so as to avoid the loss of the denseness imparted by the fine fibers.

The mass per unit area of the fused fiber layer contained in the separator of the present invention may be 5 to 30 g/m$^2$ (preferably 5 to 20 g/m$^2$, more preferably 5 to 10 g/m$^2$) so as to impart strength to the separator and thin the separator. The mass per unit area of the fine fiber layer is preferably 1 to 50 g/m$^2$, more preferably 5 to 20 g/m$^2$ so as to impart denseness to the separator. The term "mass per unit area" as used herein means a basis weight determined in accordance with a method defined in JIS P 8124 (Paper and paperboard; a method for measuring basis weight).

The separator of the present invention contains at least one fine fiber layer adjacent to the fused fiber layer. The fine fiber layer(s) may be arranged at one side of the fused fiber layer, or at both sides of the fused fiber layer. The separator of the present invention generally contains the fine fiber layer only at one side of the fused fiber layer, so as to be a thinner separator.

The separator of the present invention may be thin so as to enhance the capacity of a battery. The thickness of the separator may be less than 100 μm, preferably 90 μm or less, more preferably 80 μm or less, but may be 100 μm or more. Because too thin a separator does not have a sufficient strength, and therefore, a short circuit is liable to occur when a battery is assembled, the thickness of the separator is preferably 30 μm or more. The term "thickness" as used herein means an arithmetic mean value of 10 thicknesses randomly selected and determined in accordance with a method defined in JIS C2111 5.1(1), using an outside micrometer (0 to 25 mm) described in JIS B 7502:1994.

The separator of the present invention preferably has a tensile strength per unit mass per unit area of 2 N/5 cm width or more, more preferably 3 N/5 cm width or more, most preferably 4 N/5 cm width or more, so as to have a strength enough to avoid a short circuit when a battery is assembled. Because higher the strength is, more easily a battery can be assembled without a short circuit, the upper limit of the tensile strength per unit mass per unit area is not particularly limited. The term "tensile strength" as used herein means an arithmetic mean value of three values measured by cutting a separator into a rectangle sample with a width of 50 mm, fixing the sample to chucks (chuck-to-chuck distance=100 mm) of a tensile tester (TENSILON UTM-III-100; ORIENTEC, Co.), pulling the sample at a rate of 300 mm/min, and measuring the load when the sample is broken. The term "tensile strength per unit mass per unit area" as used herein means a value obtained by dividing the tensile strength by the mass per unit area of the separator.

The mass per unit area of the separator of the present invention varies in accordance with the thickness, and is not particularly limited, but is preferably 15 to 50 g/m², more preferably 15 to 40 g/m² so as to be a thin separator as described above.

The separator of the present invention preferably has a uniformity index of 0.1 or less, more preferably 0.09 or less, so as to impart an excellent denseness and an excellent anti-short-circuit property and uniformly hold an electrolyte, notwithstanding the thinness. The "uniformity index" as used herein means a value obtained by the following procedure.
(1) A separator is irradiated with light from a light source, and light reflected from a predetermined area of the separator is received by a photo detector to obtain brightness information.
(2) The predetermined area is divided into equal sections having an image size of 3 mm square, 6 mm square, 12 mm square, or 24 mm square, to obtain four divisional patterns.
(3) For each of the obtained divisional patterns, brightness values of equally divided sections are calculated from the brightness information.
(4) An average brightness (X) for each divisional pattern is calculated on the basis of the brightness value of each section.
(5) A standard deviation (o) for each divisional pattern is calculated.
(6) A coefficient of variation (CV) for each divisional pattern is calculated by the following equation:

Coefficient of variation $(CV)=(\sigma/X) \times 100$ (7) A group of coordinates having an X axis of the logarithm of each image size and a Y axis of the coefficient of variation corresponding to the image size is made, and regressed to a straight line by a method of least squares to calculate a slope of the line. The absolute value of the slope is regarded as the uniformity index.

In the separator of the present invention, it is preferable that the shape of the separator is maintained only by the fusion of the first and second fusible fibers and the incorporation of fine fibers into the fused fiber layer so as to impart an excellent denseness and an excellent anti-short-circuit property to the separator. This is because a separator prepared by a entangling treatment with a water jet or the like, as well as the fusion of the first and second fusible fibers and the incorporation of fine fibers, has a large mean flow pore size, i.e., has a poor denseness. Further, a separator prepared by using an adhesive such as an emulsion adhesive exhibits a high electrical resistance and a poor air permeability, due to the coating of the adhesive. When this separator is used as, for example, a separator for a sealed alkaline battery, an inner pressure is liable to become high.

The separator of the present invention has a mean flow pore size of preferably 8 μm or less, more preferably 7 μm or less, most preferably 5 μm or less, so as to impart an excellent denseness and an excellent anti-short-circuit property. The lower limit of the mean flow pore size is preferably 1 μm or more, more preferably 3 μm or more, so as to impart an excellent electrical resistance and an excellent air permeability. The maximum pore size of the separator is preferably 13 μm or less, more preferably 10 μm or less, most preferably 8 μm or less, so as to impart an excellent anti-short-circuit property. The lower limit of the maximum pore size is the same as or larger than the mean flow pore size. The ratio of the maximum pore size/the mean flow pore size is preferably 1.7 or less, more preferably 1.5 or less, so that the separator exhibits uniform pore sizes, an excellent denseness, and an excellent anti-short-circuit property. The lower limit of the ratio of the maximum pore size/the mean flow pore size is 1 when all the pores have the same pore size. The "maximum pore size" as used herein means a value measured by a bubble point method using a porometer (Coulter). The "mean flow pore size" as used herein means a value measured by a method defined in ASTM-F316, for example, a value measured by a mean-flow point method using a porometer (Coulter).

The separator of the present invention can be produced, for example, by the steps of:
(1) preparing a fused fiber sheet in which first fusible fibers are fused,
(2) preparing a slurry containing fine fibers having an average fiber diameter of 5 μm or less and second fusible fibers,
(3) scooping up the slurry with the fused fiber sheet, to thereby incorporate part of the fine fibers into the fused fiber sheet, and
(4) fixing the fine fibers by fusing the second fusible fibers in the fused fiber sheet.

First, step (1) of preparing a fused fiber sheet in which first fusible fibers are fused may be carried out in accordance with a conventional method. The fused fiber sheet preferably consists of a wet-laid nonwoven fabric so as to impart an excellent uniformity and an excellent denseness. Such a preferable wet-laid nonwoven fabric may be prepared by, for example, forming a fiber web containing the first fusible fibers by a wet-laid method (for example, a flat long-wire type, an inclined short-wire type, a cylindrical type, or a long-wire/cylindrical type), and fusing the first fusible fibers by a dryer, nip rolls, or the like. Due to the fusion of the first fusible fibers, breakages during transport in preparing separators can be avoided, and the strength of the separator can be enhanced. Because a change in the shape of the first fusible fiber to a film elevates the electrical resistance of a battery, it is preferable to avoid the change by using, as the first fusible fiber, a composite first fusible fiber consisting of two or more resins having a melting point different from each other, or by appropriately controlling heat and/or pressure conditions.

Next, step (2) of preparing a slurry containing fine fibers having an average fiber diameter of 5 μm or less and second fusible fibers is carried out. This step may be performed in a fashion similar to a method of preparing a slurry in a conventional wet-laid method. For example, fine fibers having an average fiber diameter of 5 μm or less and second fusible fibers are prepared, and treated with a pulper, a beater, a refiner, or the like to obtain individual fibers, and the individual fibers are dispersed into water to prepare a slurry.

As the fine fiber having an average fiber diameter of 5 μm or less, for example, a fiber obtained by direct spinning, an island-component fiber obtained by removing the sea component from an islands-in-sea type composite fiber, a fine fiber obtained by dividing a dividable composite fiber consisting of two or more resins having a resin composition different from each other using a beater, a refiner, or the like, or a fine fiber obtained by dividing a melt-blown nonwoven fabric prepared by a melt-blown method using a beater, a refiner, or the like, may be used. Among these fibers, the fiber obtained by direct spinning, or the island-component fiber obtained by removing the sea component from an islands-in-sea type composite fiber, each of which is uniform in fiber diameter, is preferable; the island-component fiber obtained by removing the sea component from an islands-in-sea type composite fiber, of which the fiber diameter is smaller, is more preferable; and an island-component fiber obtained by removing the sea component from an islands-in-sea type composite fiber prepared by a composite spinning method, which is uniform in fiber diameter, is most preferable. The average fiber diameter of the fine fibers is preferably 2 μm or less so as to impart an excellent denseness to the separator.

Next, step (3) of scooping up the slurry with the fused fiber sheet, to thereby incorporate part of the fine fibers into the fused fiber sheet is carried out. This step can be performed in a fashion similar to a method of preparing a fiber web by an inclined short-wire type wet-laid method. That is, in general, fibers are scooped up with a support such as a net to form a fiber web. In the step (3), the fused fiber sheet is laminated on a support such as a net, and then, the slurry containing the fine fibers and the second fusible fibers is scooped up with the fused fiber sheet, to incorporate part of the fine fibers into the fused fiber sheet, simultaneously with a discharge (i.e., dewatering) of white water from the support. As above, this step can be performed in a fashion similar to a conventional wet-laid method. In particular, when the slurry is scooped up with the fused fiber sheet by aspirating the slurry from a surface of the fused fiber sheet, the surface being opposite to a surface on which the slurry is scooped up, the fine fibers can be deeply incorporated into the fused fiber sheet, and as a result, non-uniformity of an electrolyte is not liable to occur in the interlayer between the fused fiber layer and the fine fiber layer, and the electrical resistance of a battery can be lowered. This aspiration can be carried out, for example, using a reduced pressure tank. The aspiration under reduced pressure is performed, preferably at 10 to 100 kPa, more preferably at 30 to 70 kPa, most preferably 40 to 60 kPa. Such an aspiration under reduced pressure is difficult when a cylindrical type or a long-wire type is used.

Finally, step (4) of fixing the fine fibers by fusing the second fusible fibers in the fused fiber sheet may be carried out to produce the separator of the present invention. The fixing of the fine fibers by the fusion of the second fusible fibers is preferably carried out, for example, by the fusion of the second fusible fibers by a drier, nip rolls, or the like. In this case, it is preferable to avoid a change in the shape of the second fusible fiber to a film, by using, as the second fusible fiber, a composite second fusible fiber consisting of two or more resins having a melting point different from each other, or by appropriately controlling heat and/or pressure conditions. Because when the first fusible fibers forming the fused fiber layer are fused in addition to the fusion of the second fusible fibers, the fine fibers incorporated into the fused fiber layer can be firmly fixed, it is preferable that the first fusible fibers are fused. The first fusible fibers and the second fusible fibers can be fused simultaneously or at different times, but it is preferable that the first and second fusible fibers containing the same resin(s) to be fused are used and fused simultaneously so as not to deteriorate the electrical resistance and the air permeability, which would be caused by a change in the shape of either fusible fiber to a film by an excess fusion.

As described above, in the process of the present invention, because the fused fiber sheet corresponding to the fused fiber layer is previously prepared, and the slurry containing the fine fibers is scooped up with the fused fiber sheet, even if the mass per unit area of the separator is lowered so as to be a thin separator, the separator can be produced at a high productivity, without breakages during transport. Even if the content of the fine fibers contained in the slurry is increased to enhance the denseness of the separator, the fine fibers are scooped up with the fused fiber sheet, and therefore, the fine fibers cannot be incorporated into a support (such as a net), or are so incorporated as to easily peel the product from the support, and as a result, the separator can be produced at a high productivity from this viewpoint.

The existence of the fused fiber sheet corresponding to the fused fiber layer can enhance the tensile strength of the separator. Therefore, the tensile strength can be enhanced by appropriately controlling the conditions for producing the fused fiber sheet, to produce a separator having a tensile strength per unit mass per unit area of 2 N/5 cm width or more.

A dense separator having a uniformity index of 0.1 or less, or a dense separator having a ratio of a maximum pore size/a mean flow pore size of 1.7 or less can be produced by increasing the content of fine fibers contained in the slurry. More particularly, a dense separator may be easily produced when the content of fine fibers contained in the slurry is 10% or more, preferably 20% or more, more preferably 30% or more, most preferably 40% or more.

The separator of the present invention is preferably composed of the first fusible fibers, the second fusible fibers, and/or the fine fibers made of polyolefin-based resins, to enhance a resistance to an electrolyte. When the content of these polyolefin-based fibers is high, an electrolyte-holding capacity is liable to become poor, and therefore, it is preferable to carry out a known treatment for imparting a hydrophilic property, for example, a sulfonating treatment, a treatment with fluorine gas, a graft polymerization treatment with vinyl monomers, a discharging treatment, a treatment with a surface-active agent, or a treatment to adhere hydrophilic resins.

The alkaline battery of the present invention comprises the separator of the present invention, and therefore, exhibits a high capacity and a low electrical resistance, and is capable of effectively preventing a short circuit.

The alkaline battery of the present invention may have the same constitution as that of a conventional alkaline battery, except that it contains the separator of the present invention.

For example, a cylindrical nickel-hydrogen battery has a structure in which a nickel positive electrode and a hydrogen-occluded alloy negative electrode, which are separated by the above separator and rolled into a voluted form, are put into a metal case. As the nickel positive electrode, for example, a spongy nickel porous material filled with active materials consisting of a nickel hydroxide solid solution powder may be used. As the hydrogen-occluded alloy negative electrode, for example, a nickel-plated pierced steel plank, spongy nickel, or a nickel net filled with $AB_5$ based (rare-earth based) alloy, $AB/A_2B$ based (Ti/Zr based) alloy, or $AB_2$ (Laves phase) based alloy may be used. As an electrolyte, for example, a two-component system such as potassium hydroxide/lithium hydroxide, or a three-component system such as potassium hydroxide/sodium hydroxide/lithium hydroxide may be used. The case is sealed with a sealing plate having a safety valve, via an insulating gasket. The battery has a positive collector and an insulating plate, and may have a negative collector if necessary.

The alkaline battery of the present invention is not limited to a cylindrical battery, but may be, for example, a prismatic battery or a button battery. The prismatic battery has a laminate structure in which the separator is sandwiched between the positive electrode and the negative electrode. The alkaline battery of the present invention may be a sealed battery or an open battery.

The alkaline battery of the present invention may be a primary battery, such as an alkaline-manganese battery, a mercury battery, a silver oxide battery, an air battery, or the like, or a secondary battery, such as a nickel-cadmium battery, silver-zinc battery, silver-cadmium battery, nickel-zinc battery, nickel-hydrogen battery, lead storage battery, or the like, preferably a nickel-cadmium battery or a nickel-hydrogen battery.

EXAMPLES

The present invention now will be further illustrated by, but is by no means limited to, the following Examples.

Example 1

Only high-strength core-sheath type first fusible fibers (fiber strength: 6.5 cN/dtex, average fiber diameter: 10 μm, fiber length: 5 mm) having a core component of polypropylene (melting point: 168° C.) and a sheath component of high-density polyethylene (melting point: 135° C.) were used to form a wet-laid fiber web by an inclined short-wire type wet-laid method.

The wet-laid fiber web was supported by a conveyer, and heat-treated with a hot air through dryer at 138° C., while being carried in a state where the wet-laid fiber web was brought into contact with the conveyer by aspiration from under the conveyer, to fuse only the sheath component of the high-strength core-sheath type first fusible fibers and produce a fused nonwoven fabric (i.e., a fused fiber sheet, mass per unit area: 8 g/m$^2$). A change in the shape of the high-strength core-sheath type first fusible fibers to a film did not occur.

Polypropylene fine fibers (average fiber diameter: 2 μm, fiber length: 2 mm, melting point: 168° C.) consisting of an island component remaining after removing the sea component from islands-in-sea type composite fibers spun by a composite spinning method, and high-strength core-sheath type second fusible fibers the same as the high-strength core-sheath type first fusible fibers were provided. A slurry was prepared by mixing 80 mass % of the polypropylene fine fibers and 20 mass % of the high-strength core-sheath type second fusible fibers.

While the fused nonwoven fabric was carried with a net, the slurry was scooped up with the fused nonwoven fabric to obtain a wet-laid web scooped up fused nonwoven fabric (scooped up fiber mass: 7 g/m$^2$). In this step, the slurry was aspirated (aspiration under reduced pressure: 45 kPa) using a reduced pressure tank from a surface opposite to the surface, on which the fused nonwoven fabric was carried, of the net to incorporate part of the fine fibers into the fused nonwoven fabric.

The wet-laid web scooped up fused nonwoven fabric was carried by a conveyer to a hot air through dryer at 138° C., and heat-treated to fuse a sheath component of the high-strength core-sheath type first fusible fibers of the fused nonwoven fabric and a sheath component of the high-strength core-sheath type second fusible fibers forming the wet-laid web, and produce a laminated nonwoven fabric, in which the fine fibers and the high-strength core-sheath type second fusible fibers were fixed to the fused nonwoven fabric and a fine fiber layer was formed. The wet-laid web scooped up fused nonwoven fabric could be carried without breakages, and no fibers became entangled with the conveyer during the production of the laminated nonwoven fabric.

The laminated nonwoven fabric was calendered at 60° C. under a linear pressure of 9.8 N/cm to adjust its thickness, dipped in a solution of fuming sulfuric acid (15% SO$_3$ solution) for 2 minutes at 60° C., thoroughly washed with water, and dried to obtain a sulfonated separator (mass per unit area: 15 g/m$^2$; thickness: 30 μm) having the fine fiber layer at one side of the fused fiber layer (derived from the fused nonwoven fabric). A change in the shape of the high-strength core-sheath type first fusible fibers and the high-strength core-sheath type second fusible fibers to a film did not occur. The properties of this separator are shown in Table 1.

Example 2

The procedures described in Example 1 were repeated, except that the mass ratio of the polypropylene fine fibers to the high-strength core-sheath type second fusible fibers contained in the slurry was changed to 50:50, and that a fiber mass scooped up with the fused nonwoven fabric was 17 g/m$^2$, to produce a separator (mass per unit area: 25 g/m$^2$; thickness: 52 μm). A change in the shape of the high-strength core-sheath type first fusible fibers and the high-strength core-sheath type second fusible fibers to a film did not occur. The properties of this separator are shown in Table 1.

Example 3

The procedures described in Example 1 were repeated, except that the mass ratio of the polypropylene fine fibers to the high-strength core-sheath type second fusible fibers contained in the slurry was changed to 60:40, and that a fiber mass scooped up with the fused nonwoven fabric was 32 g/m$^2$, to produce a separator (mass per unit area: 40 g/m$^2$; thickness: 77 μm). A change in the shape of the high-strength core-sheath type first fusible fibers and the high-strength core-sheath type second fusible fibers to a film did not occur. The properties of this separator are shown in Table 1.

Example 4

Only nylon first fusible fibers (fiber strength: 4.6 cN/dtex, average fiber diameter: 14 μm, fiber length: 5 mm) having a core component of nylon 66 (melting point: 255° C.) and a sheath component of a nylon copolymer (melting point: 139° C.) of nylon 6 and nylon 12 (mole ratio; nylon 6:nylon 12=35:65) were used to form a wet-laid fiber web by an inclined short-wire type wet-laid method.

The wet-laid fiber web was supported by a conveyer, and heat-treated with a hot air through dryer at 155° C., while being carried in a state where the wet-laid fiber web was brought into contact with the conveyer by aspiration from under the conveyer, to fuse only the sheath component of the nylon first fusible fibers and produce a fused nonwoven fabric (i.e., a fused fiber sheet, mass per unit area: 10 g/m$^2$). A change in the shape of the nylon first fusible fibers to a film did not occur.

Nylon 66 fine fibers (average fiber diameter: 2 μm, fiber length: 2 mm, melting point: 255° C.) consisting of an island component remaining after removing the sea component from islands-in-sea type composite fibers spun by a composite spinning method, and nylon second fusible fibers the same as the nylon first fusible fibers were provided. A slurry was prepared by mixing 60 mass % of the nylon 66 fine fibers and 40 mass % of the nylon second fusible fibers.

While the fused nonwoven fabric was carried with a net, the slurry was scooped up with the fused nonwoven fabric to obtain a wet-laid web scooped up fused nonwoven fabric (scooped up fiber mass: 30 g/m$^2$). In this step, the slurry was aspirated (aspiration under reduced pressure: 45 kPa) using a reduced pressure tank from a surface opposite to the surface, on which the fused nonwoven fabric was carried, of the net to incorporate part of the fine fibers into the fused nonwoven fabric.

The wet-laid web scooped up fused nonwoven fabric was carried by a conveyer to a hot air through dryer and heat-treated at 155° C., and was passed through two press rolls at 90° C. under a pressure of 5 N/mm to cause a pressure-bonding, to fuse a sheath component of the nylon first fusible fibers of the fused nonwoven fabric and a sheath component of the nylon second fusible fibers forming the wet-laid web, and produce a laminated nonwoven fabric, in which the fine fibers and the nylon second fusible fibers were fixed to the fused nonwoven fabric and a fine fiber layer was formed. The wet-laid web scooped up fused nonwoven fabric could be carried without breakages, and no fibers became entangled with the conveyer during the production of the laminated nonwoven fabric.

The laminated nonwoven fabric was calendered at 60° C. under a linear pressure of 9.8 N/cm to adjust its thickness. The laminated nonwoven fabric was placed between a pair of flat-shaped electrodes carrying a silicone rubber respectively in air (humidity: 60 RH %) under atmospheric pressure, so that the laminated nonwoven fabric was brought into contact with both silicone rubbers, and then an alternating current voltage (voltage: 24 kVp, output: 2.8 kW, output per unit area: 1.83 W/cm$^2$, frequency: 25 KHz, waveform: sinusoidal wave) was applied between the electrodes to thereby induce an electric discharge inside of the laminated nonwoven fabric, to obtain a hydrophilic separator (mass per unit area: 40 g/m$^2$; thickness: 80 μm) having the fine fiber layer at one side of the fused fiber layer (derived from the fused nonwoven fabric). A change in the shape of the nylon first fusible fibers and the nylon second fusible fibers to a film did not occur. The properties of this separator are shown in Table 1.

Example 5

The procedures described in Example 1 were repeated, except that a fiber mass scooped up with the fused nonwoven fabric was 32 g/m$^2$, to produce a separator (mass per unit area: 40 g/m$^2$; thickness: 84 μm). A change in the shape of the high-strength core-sheath type first fusible fibers and the high-strength core-sheath type second fusible fibers to a film did not occur. The properties of this separator are shown in Table 2.

Comparative Example 1

A slurry consisting of 80 mass % of the high-strength core-sheath type first fusible fibers the same as those described in Example 1 and 20 mass % of the polypropylene fine fibers the same as that described in Example 1 was used to prepare a wet-laid fiber web by an inclined short-wire type wet-laid method.

The wet-laid fiber web was supported by a conveyer, and heat-treated with a hot air through dryer at 138° C., while being carried in a state where the wet-laid fiber web was brought into contact with the conveyer by aspiration (aspiration under reduced pressure: 45 kPa) from under the conveyer, to fuse only the sheath component of the high-strength core-sheath type first fusible fibers and produce a fused nonwoven fabric (mass per unit area: 40 g/m$^2$).

The fused nonwoven fabric was calendered at 60° C. under a linear pressure of 9.8 N/cm to adjust its thickness, dipped in a solution of fuming sulfuric acid (15% SO$_3$ solution) for 2 minutes at 60° C., thoroughly washed with water, and dried to obtain a sulfonated separator (mass per unit area: 40 g/m$^2$; thickness: 92 μm). The properties of this separator are shown in Table 1.

Comparative Example 2

The procedures described in Comparative Example 1 were repeated, except that a slurry consisting of 70 mass % of the high-strength core-sheath type first fusible fibers the same as those described in Example 1 and 30 mass % of the polypropylene fine fibers the same as those described in Example 1 was used, to produce a separator (mass per unit area: 25 g/m$^2$; thickness: 72 μm). The properties of this separator are shown in Table 1. When a wet-laid fiber web was formed, part of the fine fibers were incorporated into a papermaking wire, and it was difficult to peel the wet-laid fiber web from the papermaking wire.

Comparative Example 3

Fused nonwoven fabrics (mass per unit area: 20 g/m$^2$) were produced in accordance with the method described in Comparative Example 1. A laminate of two fused nonwoven fabrics was formed and subjected to a hot air through dryer at 138° C. The heat-treated laminate which came out of the dryer was immediately passed through a heat calender roll at 90° C. to obtain a two-layer-laminated nonwoven fabric.

The resulting two-layer-laminated nonwoven fabric was calendered at 60° C. under a linear pressure of 9.8 N/cm to adjust its thickness, dipped in a solution of fuming sulfuric acid (15% SO$_3$ solution) for 2 minutes at 60° C., thoroughly washed with water, and dried to obtain a sulfonated separator (mass per unit area: 40 g/m$^2$; thickness: 90 μm) consisting of the two-layer-laminated nonwoven fabric. The properties of this separator are shown in Table 1. A change in the shape of part of the high-strength core-sheath type first fusible fibers to a film occurred.

Comparative Example 4

Core-sheath type first fusible fibers (fiber strength: 4 cN/dtex, fiber diameter: 10 μm, fiber length: 10 mm) having a core component of polypropylene (melting point: 168° C.) and a sheath component of high-density polyethylene (melting point: 135° C.), dividable composite fibers (fiber diameter: 21 μm, fiber diameter of polypropylene fibers after dividing: 5 μm, fiber diameter of ethylene-vinylalcohol copolymer fiber after dividing: 5 μm, fiber length: 6 mm) having an 16-dividable orange-type cross-sectional shape consisting of the first component of polypropylene (melting point: 165° C.) and the second component of an ethylene-vinylalcohol copolymer (melting point: 175° C.), and high-strength polypropylene fibers (melting point: 163° C., fiber strength: 8 cN/dtex, fiber diameter: 12 μm, fiber length: 10 mm) were mixed at a ratio of 40 mass %:20 mass %:40 mass % to prepare a slurry. The slurry was stirred for 30 minutes using a pulper to disperse the fibers and divide the dividable composite fibers into fine fibers at the same time.

The resulting slurry was used to form a wet-laid fiber web by an inclined short-wire type wet-laid method. The wet-laid fiber web was supported by a conveyer, and heat-treated with a hot air through dryer at 135° C., while being carried in a state where the wet-laid fiber web was brought into contact with the conveyer by aspiration (aspiration under reduced pressure: 45 kPa) from under the conveyer, to dry the fiber web and fuse only the sheath component of the core-sheath type first fusible fibers, and a fused nonwoven fabric (mass per unit area: 15 g/m$^2$) was produced.

Another slurry in which the fibers were dispersed and the dividable composite fibers were divided into fine fibers was prepared by the same procedure as described above, and a wet-laid fiber web containing water was formed from the slurry by an inclined short-wire type wet-laid method.

While the fused nonwoven fabric was carried by a conveyer, the wet-laid fiber web containing water was placed on the fused nonwoven fabric. This laminate was carried by the conveyer, and dehydrated by aspirating water from under the conveyer using a suction box for dehydration to lower the moisture content. The laminate was subjected to a cylinder dryer at 135° C. to dry the laminate and fuse only the sheath component of the core-sheath type first fusible fibers at the same time, and a laminated nonwoven fabric (mass per unit area: 40 g/m$^2$) was produced.

The laminated nonwoven fabric was calendered at 60° C. under a linear pressure of 9.8 N/cm to adjust its thickness, dipped in a solution of fuming sulfuric acid (15% SO$_3$ solution) for 2 minutes at 60° C., thoroughly washed with water, and dried to obtain a sulfonated separator (mass per unit area: 40 g/m$^2$; thickness: 95 μm). The properties of this separator are shown in Table 1. The interlayer of the separator exhibited a low adhesiveness and only a few fibers were incorporated, and therefore, delamination was liable to occur.

Comparative Example 5

Core-sheath type fusible fibers (fiber strength: 4 cN/dtex, fiber diameter: 10 μm, fiber length: 10 mm) having a core component of polypropylene (melting point: 168° C.) and a sheath component of high-density polyethylene (melting point: 135° C.), and dividable composite fibers (fiber diameter: 18 μm, fiber diameter of polypropylene fibers after dividing: 4 μm, fiber diameter of high-density polyethylene fiber after dividing: 4 μm, fiber length: 6 mm) having an 16-dividable orange-type cross-sectional shape consisting of the first component of polypropylene (melting point: 160° C.) and the second component of high-density polyethylene (melting point: 130° C.) were mixed at a ratio of 30 mass %:70 mass % to prepare a slurry. The slurry was stirred for 30 minutes using a pulper to disperse the fibers and divide the dividable composite fibers into fine fibers at the same time.

The resulting slurry was used to form a wet-laid fiber web by an inclined short-wire type wet-laid method. The wet-laid fiber web was supported by a conveyer, and heat-treated with a hot air through dryer at 135° C., while being carried in a state where the wet-laid fiber web was brought into contact with the conveyer by aspiration (aspiration under reduced pressure: 45 kPa) from under the conveyer, to dry the fiber web and fuse only the sheath component of the core-sheath type fusible fibers, and a fused nonwoven fabric (mass per unit area: 39 g/m$^2$) was produced.

This fused nonwoven fabric was mounted on a plain weave wire (wire diameter: 0.132 mm, 100 mesh). While being carried at a speed of 10 m/min., the fused nonwoven fabric was treated with a water jet (pressure=12.7 MPa) ejected from a nozzle plate (nozzle diameter: 0.15 mm, pitch between nozzles: 0.7 mm), from each side of the fused nonwoven fabric in turn twice, to divide the dividable composite fibers into fine fibers and entangle fibers with each other, and a fused and entangled nonwoven fabric was produced.

Another slurry was prepared by dispersing synthetic pulp (maximum diameter: 3.5 μm, length: 2.9 mm or less) made of a low-density polyethylene resin (melting point: 110° C.) using a pulper.

While the fused and entangled nonwoven fabric was carried with a net, the slurry of synthetic pulp was scooped up with the fused and entangled nonwoven fabric to obtain a wet-laid web scooped up fused and entangled nonwoven fabric (scooped up fiber mass: 1 g/m$^2$). In this step, the slurry was aspirated using a reduced pressure apparatus from a surface opposite to the surface, on which the fused and entangled nonwoven fabric was carried, of the net to incorporate part of the synthetic pulp into the fused and entangled nonwoven fabric.

This wet-laid web scooped up fused and entangled nonwoven fabric was supported with a conveyer, and heat-treated with a hot air through dryer at 115° C., while being carried in a state where the wet-laid web scooped up fused and entangled nonwoven fabric was brought into contact with the conveyer by aspiration from under the conveyer, to dry the nonwoven fabric and fuse only the synthetic pulp lightly, and a laminated fused nonwoven fabric was produced.

The laminated fused nonwoven fabric was calendered at 60° C. under a linear pressure of 9.8 N/cm to adjust its thickness, dipped in a solution of fuming sulfuric acid (15% SO$_3$ solution) for 2 minutes at 50° C., thoroughly washed with water, and dried to obtain a sulfonated separator (mass per unit area: 40 g/m$^2$; thickness: 95 μm).

Comparative Example 6

The procedures described in Example 1 were repeated, except that a slurry of 100% polypropylene fine fibers was used and that a fiber mass scooped up with the fused nonwoven fabric was 32 g/m$^2$, to produce a separator (mass per unit area: 40 g/m$^2$; thickness: 80 μm). The properties of this separator are shown in Table 2.

Comparative Example 7

The procedures described in Comparative Example 4 were repeated, except that a slurry of 100% polypropylene fine fibers described in Example 1 was used, to produce a separator (mass per unit area: 40 g/m$^2$; thickness: 92 μm). The properties of this separator are shown in Table 2.

Comparative Example 8

The procedures described in Example 1 were repeated, except that the mass ratio of the polypropylene fine fibers to the high-strength core-sheath type second fusible fibers contained in the slurry was changed to 60:40, that the fiber mass scooped up with the fused nonwoven fabric was 32 g/m$^2$, and that the aspiration under reduced pressure was 5 kPa, to produce a separator (mass per unit area: 40 g/m$^2$; thickness: 81 μm). The properties of this separator are shown in Table 2.

Evaluation of Cycle Property

As the current collector of an electrode, a paste nickel positive electrode (width: 41 mm, length: 70 mm) prepared from a foamed nickel base, and a paste hydrogen-occluded alloy negative electrode (misch metal alloy, width: 40 mm, length: 100 mm) were formed.

Each of the separators prepared in Examples 1 to 4 and Comparative Examples 1 to 5 was cut into a separator sample (width: 42 mm, length: 176 mm). The separator sample was sandwiched between the positive and negative electrodes and rolled into a voluted form to obtain electrodes.

Each of the electrodes was put into an outer container, 5N potassium hydroxide and 1N lithium hydroxide were poured in the container as electrolytes, and the container was sealed to obtain a cylindrical nickel-hydrogen battery (capacity: AA 1600 mAh).

After each cylindrical nickel-hydrogen battery was activated, a charging-discharging cycle consisting of charging at a charging rate of 0.1 C to 120%, resting for 15 minutes, and discharging at a discharge rate of 0.2 C to a final voltage of 0.8 V was repeated, to determine a number of charging-discharging cycles when the discharging capacity was lowered to less than 80% of the initial capacity. The measurement was carried out ten times for each battery, and an arithmetic mean value was calculated and regarded as a number of cycles. The results are shown in Tables 1 and 2.

Measurement of Electrical Resistance

Each of the separators prepared in Examples 1 to 4 and Comparative Examples 1 to 5 was cut into a separator sample (35 mm square), and the mass ($W_0$) thereof was measured. After each sample was dipped in an electrolyte (1.3d-KOH), the mass (W) thereof was measured, and a ratio for holding an electrolyte (Rr, unit: %) was calculated from the following equation:

$$Rr=(W-W_0)/W_0$$

A filter paper was used to absorb the electrolyte from each sample so as to adjust the ratio for holding an electrolyte to 1000.

Each sample was sandwiched between nickel plates (40 mm square), and an electrical resistance (unit: Ω) was measured using a milliohm meter under a load of 49 N from the top. The results are shown in Tables 1 and 2.

structure; the electrolyte was unevenly distributed and the boundary was the interlayer; the electrical resistance when the ratio for holding an electrolyte was lowered to 100% (corresponding to the resistance of a separator contained in a battery during charging-discharging cycles) was high; and the cycle property was poor.

By contrast, with respect to the batteries using the separators of the present invention, no boundary was recognized in the interlayer and nonuniformity of an electrolyte was not liable to occur, due to the incorporation of fine fibers into the fused fiber layer, and therefore, when the ratio for holding an electrolyte was lowered to 100%, a slightly increased electrical resistance was observed, but did not affect the cycle property, i.e., resulted in a long lifetime of the battery.

TABLE 1

|   | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| A | 15 | 25 | 40 | 40 | 40 | 25 | 40 | 40 | 40 |
| B | 30 | 48 | 77 | 80 | 92 | 72 | 90 | 95 | 95 |
| C | 54 | 133 | 157 | 165 | 105 | 52 | 145 | 120 | 88 |
| D | 4.4 | 5.3 | 4 | 4.1 | 2.6 | 1.4 | 3.6 | 3 | 2.2 |
| E | 6.9 | 5.8 | 4.7 | 5.1 | 5.9 | 7.5 | 6 | 8.2 | 6.1 |
| F | 9.8 | 8.2 | 7.2 | 7.6 | 12.6 | 17.3 | 12.1 | 15.6 | 9.2 |
| G | 1.4 | 1.4 | 1.5 | 1.5 | 2.1 | 2.3 | 2 | 1.9 | 1.5 |
| H | 0.095 | 0.085 | 0.08 | 0.082 | 0.11 | 0.125 | 0.105 | 0.101 | 0.105 |
| I | × | × | × | × | — | — | 4.5 | 3.1 | × |
| J | 560 | 580 | 540 | 530 | 350 | 410 | 300 | 400 | 380 |
| K | 1.4 | 1.5 | 1.8 | 1.8 | 1.3 | 1.2 | 12.5 | 9.8 | 14.1 |

TABLE 2

|   | Example 5 | Comparative Example 6 | Comparative Example 7 | Comparative Example 8 |
|---|---|---|---|---|
| A | 40 | 40 | 40 | 40 |
| B | 84 | 80 | 92 | 81 |
| C | 135 | 72 | 44 | 148 |
| D | 3.4 | 1.8 | 1.1 | 3.7 |
| E | 3.4 | 1.9 | 3.8 | 4.9 |
| F | 4.8 | 2.9 | 5.1 | 7.4 |
| G | 1.4 | 1.6 | 1.3 | 1.5 |
| H | 0.075 | 0.072 | 0.081 | 0.084 |
| I | × | × | × | 3.6 |
| J | 550 | 390 | 320 | 360 |
| K | 1.7 | 2.1 | 7.9 | 5.4 |

In Tables 1 and 2, A is a mass per unit area (unit: g/m²), B is a thickness (unit: μm), C is a tensile strength in the lengthwise direction (unit: N/50 mm width), D is a tensile strength per unit mass per unit area (unit: N/50 mm width), E is a mean flow pore size (unit: μm), F is a maximum pore size (unit: μm), G is a ratio of (maximum pore size)/(mean flow pore size), H is a uniformity index, I is a delamination strength (unit: N), J is a cycle property (unit: cycles), K is an electrical resistance (unit: Ω) when the ratio for holding an electrolyte is 100%, respectively. In the row I (delamination strength), the symbol "×" means that delamination occurred in the fine fiber layer, and the determination resulted in failure. The symbol "--" means that the separator had a single-layered structure.

The results shown in Tables 1 and 2 show as follows. With respect to the battery using the separator in which the fused nonwoven fabrics were laminated prepared in Comparative Example 3, the battery using the separator in which the wet-laid fiber web was laminated on the fused nonwoven fabric prepared in Comparative Example 4, and the battery using the separator in which synthetic pulp was scooped up with the fused and entangled nonwoven fabric prepared in Comparative Example 5, each separator had a clearly-recognized layer From a comparison between Examples 1 to 4 as the separator of the present invention and Comparative Examples 1 to 2 having a single-layered structure, the separator of the present invention had a small mean flow pore size and a small maximum pore size, and exhibited an excellent uniformity having a low uniformity index, and therefore, had an excellent cycle property, in spite of the thinness.

From a comparison between Example 3 and Comparative Example 6, it was found that, due to the existence of the second fusible fibers, a tensile strength per unit mass per unit area was enhanced and nonuniformity of an electrolyte was not liable to occur, and as a result, the electrical resistance was lowered and the cycle property was improved.

From a comparison between Example 3 and Comparative Example 8, it was found that, when fine fibers were incorporated into the fused fiber layer so that delamination occurred in the fine fiber layer, nonuniformity of an electrolyte was not liable to occur, and as a result, the electrical resistance was lowered and the cycle property was improved.

Although the present invention has been described with reference to specific embodiments, various changes and modifications obvious to those skilled in the art are possible without departing from the scope of the appended claims.

The invention claimed is:
1. An alkaline battery separator, comprising:
   a fused fiber layer in which first fusible fibers having a fiber length of 1 to 15 mm are fused, and
   a fine fiber layer adjacent to the fused fiber layer and comprising fine fibers having a fiber length of 1 to 15 mm and an average fiber diameter of 5 μm or less and second fusible fibers having a fiber length of 1 to 15 mm, which are fused in the fine fiber layer,
   and wherein part of the fine fibers are incorporated into the fused fiber layer so that, in the event of delamination between the fused fiber layer and the fine fiber layer, delamination occurs in the fine fiber layer, wherein the shape of the separator is maintained only by the fusion of the first and second fusible fibers and the incorporation of the fine fibers into the fused fiber layer, and wherein the tensile strength per unit mass per unit area of the separator is 3 N or more, as a value measured using a separator sample with a width of 5 cm.

2. The alkaline battery separator according to claim 1, wherein the fine fiber has an average fiber diameter of 2 μm or less.

3. The alkaline battery separator according to claim 1, wherein the fused fiber layer has a mass per unit area of 5 to 30 g/m$^2$, and the fine fiber layer has a mass per unit area of 1 to 50 g/m$^2$.

4. The alkaline battery separator according to claim 1, wherein the separator has a uniformity index of 0.1 or less.

5. The alkaline battery separator according to claim 1, wherein the separator has a ratio of a maximum pore size/a mean flow pore size of 1.7 or less.

6. An alkaline battery comprising the alkaline battery separator according to claim 1.

7. A process for manufacturing the alkaline battery separator according to claim 1, comprising:

preparing a fused fiber sheet in which first fusible fibers having a fiber length of 1 to 15 mm are fused, preparing a slurry containing fine fibers having a fiber length of 1 to 15 mm and having an average fiber diameter of 5 μm or less and second fusible fibers having a fiber length of 1 to 15 mm, feeding the slurry on the fused fiber sheet, to thereby incorporate part of the fine fibers into the fused fiber sheet, and fixing the fine fibers by fusing the second fusible fibers in the fused fiber sheet.

8. The process according to claim 7, wherein the fused fiber sheet is made of a wet-laid nonwoven fabric.

9. The process according to claim 7, wherein the fine fibers have an average fiber diameter of 2 μm or less.

10. The process according to claim 7, wherein the slurry is fed on the fused fiber sheet by aspirating the slurry from a surface of the fused fiber sheet, said surface being opposite to a surface on which the slurry is fed.

* * * * *